United States Patent [19]

Kiyohara et al.

[11] Patent Number: 4,712,172
[45] Date of Patent: Dec. 8, 1987

[54] METHOD FOR PREVENTING NON-DISCHARGE IN A LIQUID JET RECORDER AND A LIQUID JET RECORDER

[75] Inventors: Takehiko Kiyohara, Zama; Koji Terasawa, Mitaka; Akira Miyakawa, Tanashi, all of Japan

[73] Assignee: Canon Kabushiki Kaisha, Tokyo, Japan

[21] Appl. No.: 722,396

[22] Filed: Apr. 12, 1985

[30] Foreign Application Priority Data

Apr. 17, 1984 [JP] Japan .................................. 59-75866

[51] Int. Cl.⁴ ............................................ G01D 15/16
[52] U.S. Cl. .................... 346/1.1; 346/140 R
[58] Field of Search ........................ 346/140, 75, 1.1

[56] References Cited

U.S. PATENT DOCUMENTS

| | | | |
|---|---|---|---|
| 4,176,363 | 11/1979 | Kasahara | 346/140 |
| 4,245,224 | 1/1981 | Isayama | 346/140 X |
| 4,313,124 | 1/1982 | Hara | 346/140 |
| 4,350,448 | 9/1982 | Hanagata | 346/76 PH X |
| 4,463,359 | 7/1984 | Ayata | 346/140 X |

Primary Examiner—Joseph W. Hartary
Attorney, Agent, or Firm—Fitzpatrick, Cella, Harper & Scinto

[57] ABSTRACT

In a recorder having a record head which discharges liquid to record dots and which has a discharge energy generating element arranged on a substrate, a liquid discharge port arranged for the discharge energy generating element and a liquid path for supplying the liquid to the liquid discharge path, non-discharge of the liquid in the recorder is prevented by energizing the discharge energy generating element in a non-discharge condition when the recorder is powered on and/or when a predetermined waiting time has elapsed.

18 Claims, 10 Drawing Figures

METHOD FOR PREVENTING NON-DISCHARGE IN A LIQUID JET RECORDER AND A LIQUID JET RECORDER

BACKGROUND OF THE INVENTION

1. Field of the Invention

The present invention relates to a method for preventing non-discharge in a liquid jet recorder, and more particularly to a method for preventing non-discharge in a liquid jet recorder to assure positive recording.

2. Description of the Prior Art

Liquid jet recorders have been recently widely used because their structure can be simple and they can record in color and at a high speed.

On the other hand, a liquid jet recorder can malfunction, for example, because a liquid discharge port clogs due to evaporation of the volatile component of the liquid in the vicinity of the liquid discharge port.

In prior art liquid jet recorders, in order to resolve the above problems, cap means is used to cover the liquid discharge port or pump means is provided for removing high viscosity liquid in the vicinity of the liquid discharge port to recover a discharge function. However, in a recorder which requires manual operation of the cap means or the pump means, the user is obliged to operate such means prior to the start of the record operation. Accordingly, such a recorder is very inconvenient to use.

A recorder which electrically operates such means by a motive force source such as a motor or an electromagnetic plunger is more convenient to use than the above recorder but the cost of such a recorder is greater because of the additional motive force source and its control circuit.

It has been proposed to prevent the solidification of the liquid in the liquid discharge port by causing a liquid discharge which is not related to a record at a predetermined time interval prior to the start of the record operation of the recorder and during a non-operating period of the recorder. However, this method increases consumption of liquid independently from recording.

SUMMARY OF THE INVENTION

It is an object of the present invention to provide an inexpensive arrangement for preventing non-discharge in a liquid jet recorder.

It is another object of the present invention to provide a method for preventing non-discharge in a liquid jet recorder in which a current to be applied a resistor is energized under non-discharge condition immediately prior to the start of the record operation in order to stabilize the liquid discharge condition of the record head so that a viscosity of the liquid in the liquid discharge port is lowered, non-discharge of the liquid is prevented, the number of non-record discharges is reduced and the waste of the liquid is minimized.

It is other object of the present invention to provide a method for preventing non-discharge in a liquid jet recorder which uses an electro-thermal transducer suitable for mass-production as a discharge energy generating element to provide an inexpensive recorder and has a record head having a glass substrate on which the transducer is mounted or a substrate having a glass layer mounted in a vicinity of the transducer.

It is other object of the present invention to provide a method for preventing non-discharge in a liquid jet recorder in which an electro thermal transducer is energized under non-discharge condition and then non-recording discharge is made.

It is other object of the present invention to provide a method for preventing non-discharge in a liquid jet recorder having a dot recording head which has a discharge energy generating element mounted on a substrate, a liquid discharge port arranged correspondingly to the discharge energy generating element and a liquid path for supplying liquid to the liquid discharge port, in which the discharge energy generating element is energized under non-discharge condition at least when the recorder is powered on or when a predetermined rest time period has been elapsed.

DETAILED DESCRIPTION OF THE PREFERRED EMBODIMENTS

Figure 1:
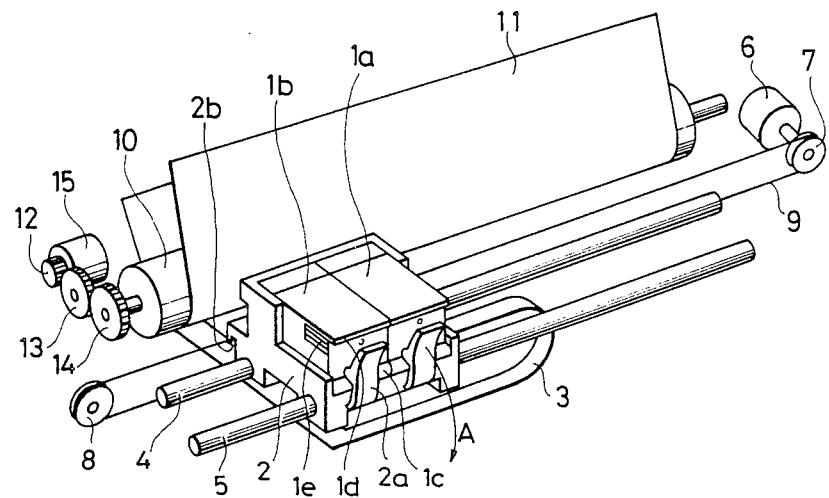
FIG. 1 is a perspective view of a major portion of one embodiment of a recorder of the present invention.

FIG. 1 is a perspective view of one embodiment of a liquid jet recorder of the present invention. Numerals 1a and 1b denote record heads which are identical in structure but record with different colors of liquid. For example, the head 1a contains black ink and the head 1b contains red ink. Engagements 1c and grips 1d and 1e are provided on the front ends of each of the heads 1a and 1b.

Numeral 2 denotes a carriage having hooks 2a. The engagements 1c of the record heads 1a and 1b engage the hook 2a so that the record heads 1a and 1b are exchangeably fixed to the carriage 2.

In order to remove the record head from the carriage 2, the hook 2a is rotated in a direction of an arrow and the grip 1d is raised by a finger tip and the grip 1e is lifted up.

Numeral 3 denotes a flexible cable which electrically connects the heads 1a and 1b to an electrical control circuit (not shown).

The carriage 2 is slidably mounted on the guide shafts 4 and 5 and one end 2b thereof is coupled to a wire 8 extending beween a drive pulley 7 mounted on a shaft of a motor 6 mounted at an end of the carriage 2 and a pulley 8 mounted at the one end of the carriage 2.

Accordingly, the rotation of the motor 6 is transmitted to the carriage 2 through the pulleys 7 and 8 and the wire 9 and the carriage 2 is driven laterally by the motor 6.

A platen 10 arranged in parallel to the guide shafts 4 and 5 feeds a record paper 11 ina sub-scanning direction. The platen 10 is rotated through a drive gear of a motor 15 and intermediate gears 13 and 14.

Time record operation is now explained. As the motor 6 rotates, the carriage 2 is moved rightwardly in FIG. 1 and the record head 1a makes a record on the record paper 11 in accordance with a print signal sent through the flexible cable 3 while the carriage 2 is moved. A record signal to the record head 1b containing different color liquid is sent to the record head 1b at a timing lagged in accordance with the spacing between the liquid discharge ports of the record heads 1a and 1b. The two color records are alternately made at a predetermined interval or, when one record head contains red ink and the other record head contains black ink, a red underline may be drawn under black characters. While two record heads are shown in the present embodiment, a multi-color record may be made by three to four record heads.

When the record head 1a comes to the right end, the carriage 2 is stopped and the platen roller 10 is rotated by the motor 15 so that the record paper 11 is fed in the sub-scanning direction by one line space.

Then, the motor 6 is rotated in the reverse direction and the carriage 2 is moved leftward so that the record heads 1a and 1b make records until they reach the left end. Since the record head 1b is ahead in this case, the record head 1a makes the record at a timing delayed by the predetermined time period from the record head 1b.

When the record heads 1b and 1a reach the left end, the carriage 2 is stopped and the record paper 11 is fed by the motor 15 in the sub-scanning direction by one line space. The above operation is repeated so that a desired sentence or image is recorded on the record paper 11.

Figure 2:
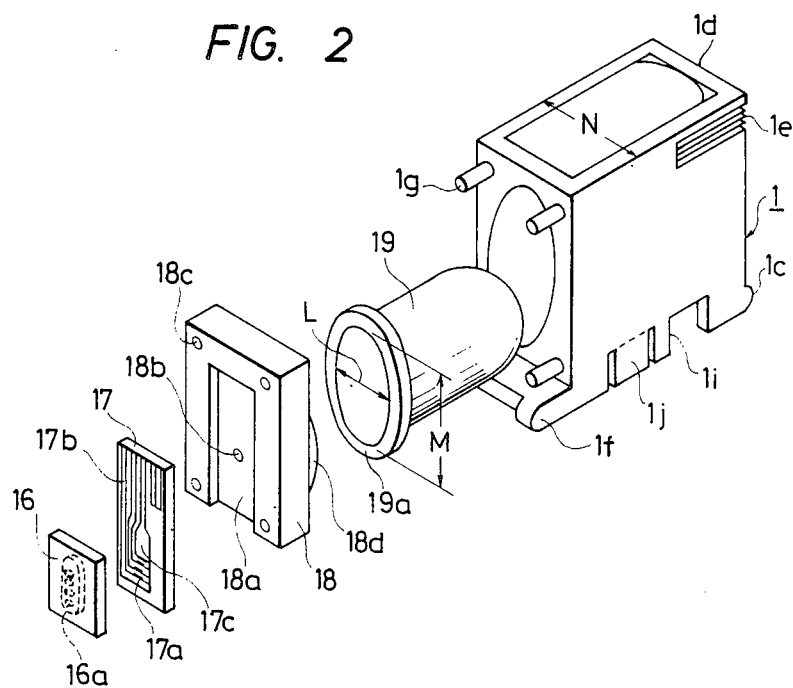
FIG. 2 is a developed perspective view of a record head.
Figure 3:
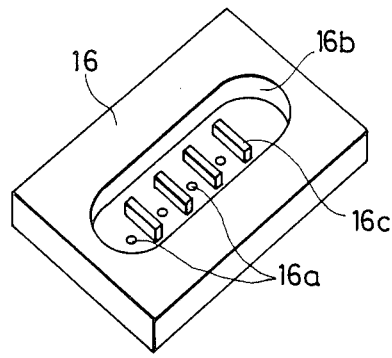
FIG. 3 is a perspective view of a liquid discharge port.

FIGS. 2 and 3 are perspective views of the detailed construction of one embodiment of the head of the recorder of the present invention. Numeral 16 denotes a liquid discharge member having a plurality of liquid discharge ports. It may be made of nickel by an electrocasting method or by etching glass. It may also be made of hardened film of photosensitive resin. A groove 16b is formed in a back surface of the liquid discharge member 16 and the liquid discharge ports 16a and walls 16c are formed in the grooves 16b. The walls 16c serve to prevent liquid from being discharged from liquid discharge ports when liquid is to be discharged from designated discharge ports 16a. Since the groove 16b surrounds the liquid discharge ports 16a, ink discharge pressure in the liquid discharge ports 16a is prevented from escaping during the discharge operation, crosstalk among the discharge ports is reduced and liquid discharge efficiency is improved. The walls 16c are not always necessary so long as a desired record is attained.

Numeral 17 denotes a substrate made of vitreous material which is much more inexpensive than materials heretofore used such a silicon or zirconium. A plurality of electro-thermal transducers 17a, a plurality of electrodes 17b and a liquid supply aperture 17c are formed on the substate 17. When current is supplied to the electrode 17b, the transducer 17a generates a thermal energy. The transducer 17a may have a protection layer for protecting it from an electrochemical reaction which may be caused by contact with the ink. The size of the transducer 17a is 50 $\mu$m $\times$ 50 $\mu$m in the present embodiment. The substrate 17 may be an inexpensive ceramics plate having a vitreous layer at least in a vicinity of an area on which the transducers are mounted. The vitreous layer has an appropriate head storage effect necessary for high speed temperature rise.

Numeral 18 denotes a substrate holder which has a groove 18a in which the substrate 17 is mounted, a liquid supply aperture 18b and a pluralty of connecting holes 18c. Numeral 19 denotes a liquid bag having a flange 19a.

An opening of the liquid bag 19 is of ellipse having a width L and a height M where L<M. In order to reduce the head width N as much as possible and increase a liquid capacity of the liquid bag 19, it is effective to use the elliptic opening. The record head housing 1 further has a rear engagement 1f, a plurality of coupling pins 1g and a liquid bag container 1h. A notch 1i at a lower end is formed by snapping off a projection 1j. The projections 1j are formed at four points at the low ends of the record heads 1a and 1b and one of the projections which corresponds to the color of liquid in the liquid bag 19 is snapped off to form the notch 1i.

Figure 4:
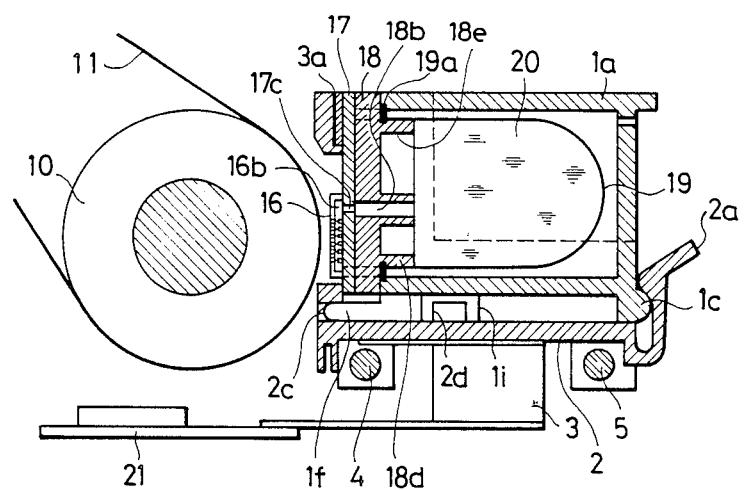
FIG. 4 is a longitudinal sectional view of a major portion.

Referring to FIG. 4, assembling of the record heads 1a and 1b, mounting to the record head 1a and 1b and the carriage 2 and record operation by the record heads 1a and 1b are explained. FIG. 4 is a sectional view taken along a center direction of the record head 1a in FIG. 1.

The liquid discharge member 16 and the substrate 17 are bonded by bonding material. The substrate 17 and the holder 18 are also bonded by bonding material. A groove 18e is formed in an outer periphery of a flange 18d fomed on the holder 18, and the liquid bag 19 containing the liquid 20 is coupled to the holder with an inner portion of the flange 19a of the liquid bag 19 extending into the groove 18e.

In FIG. 2, the coupling pins 1g are fitted to the coupling holes 18c of the holder 18 and the ends of the coupling pins 1g are crushed to couple the holder 18 to the housing 1. When the holder 18 is coupled to the housing 1 by an automated machine, the liquid bag 19 is not disengaged from the holder 18 when the housing 1 is mounted because the liquid bag 19 is securely coupled to the holder 18 with the flange 19a thereof extending into the groove 18e. Accordingly, the assembly efficiency is improved.

The mounting of the record heads 1a and 1b on the carriage 2 is now explained. The rear engagements 1f of the record heads 1a and 1b couple to the aperture 2c of the carriage 2 and the front engagements 1c couple to the hook 2a so that the record heads 1a and 1b are fixed to the carriage 2.

Since the engagements 1c and 1f are formed on the housing 1, the force created by fixing the record heads 1a and 1b to the carriage 2 is applied to the housing 1, but the housing 1 absorbs such force because of its high rigidity and the substrate 17 on which the transducers 17a are mounted is little affected by a strain due to the above force. Accordingly, the transducers are not broken by mounting the record heads on the carriage.

On the other hand, because the engagements are formed in the front and rear portions of the record heads, the record heads 1a and 1b can be mounted on the carriage 2 closely to each other without space therebetween.

Because the record heads are arranged closely to each other, the spacing between the liquid discharge ports of the record heads can be reduced, the scan stroke of the carriage 2 to the record paper 11 is reduced and the size of the recorder is reduced.

The projecting members 2d on the upper surface of the carriage 2 engage with the notches 1i of the record heads 1a and 1b. As many projecting members as the number of mounting positions of the record heads are provided. For example, the head containing the black liquid is mounted only at a specified position.

The liquid 20 in the liquid bag 19 is supplied to the groove 16b of the liquid discharge member 16 through the liquid supply port 18a of the holder 18 and the liquid supply port 17c of the substrate 17. Since the liquid bag 19 contains the liquid 20 therein in a collapsed state, a force to return the liquid 20 to the liquid bag 19 acts on the liquid in the liquid discharge port 16a by a restoring force of the liquid bag 19. Accordingly, the liquid does not leak from the liquid discharge port 16a by a change in atmospheric pressure on the vibration of the record heads 1a and 1b.

The record operation is now explained. A recording pulse current generated by a head controller 21 shown in FIG. 4 is supplied to the transducers 17a from the electrodes 3a at the end of the flexible calbe 3 through the electrodes 17b of the substrate 17. Since the transducers 17 to which the print pulse is applied are momentarily heated to approximately 300° C., the liquid 20 on the transducers 17a is momentarily vaporized and air bubbles are generated. Thus, the liquid 20 in the liquid discharge ports 16a is jetted from the liquid discharge ports 16a by discharge energy applied thereto and strike the record paper 11 to form a record. As the liquid is discharged from the liquid discharge port 16a, a vacuum is created at the groove 16b and the liquid 20 in the liquid bag 19 flows into the groove 16. The above operation is repeated during the movement of the carriage 2 and characters on an image are formed on the record paper 11.

The liquid 20 is now explained. Since the liquid is usually ink, it is hereinafter referred to as ink. The ink primarily consists of water, polyethylene glycol, diethylene glycol and dye. The proportions of those ingredients is usually 50% by weight of water and 50% by weight of the others. When water is 60% by weight and the others are 40% by weight, the viscosity of the ink is greatly lowered, the fluidity of the ink in the liquid discharge port increases, the discharge of the ink at the start of prink operation is assured, the discharge frequency can be increased and high speed printing is attained. However, the water is evaporated from the tip end of the liquid discharge port as the liquid discharge port is left exposed at the atmosphere, and the viscosity of the ink in the liquid discharge port increases. The rate of such viscosity increase is higher when the water content is 60% by weight than when the water content is 50% by weight.

Accordingly, in the ink having the water content of 60%, the ingredients other than water are relatively rapidly precipitated and solidified in the liquid discharge port. If the ink ingredients are solidified in the liquid discharge port, the discharge function in the discharge port may not be recovered by any means. In prior art recorders, in order to prevent the solidification of the ink, the liquid discharge port is closed by cap means, humidity is added to a cap provided to cover the liquid discharge port or non-recording idle discharge is effected periodically to refresh the ink in the liquid discharge port. In the present embodiment of the invention, since the end of the liquid discharge port is always opened to the atmosphere, the ink having water content of 50% to 55% is used to prevent the solidification of the ink.

As the end of the liquid discharge port is always opened to the atmosphere during a period after the end of the print operation and the start of the next print operation, the water is evaporated at the end of the liquid discharge port particularly in a dry atmosphere, the viscosity of the ink in the vicinity of the liquid discharge port increases and the ink may not discharge at the start of the next print operation. In order to decrease the viscosity of such high viscosity ink, it has been experimentarily proved that the vicinity of the liquid discharge port may be rapidly heated to 60° C. to 80° C.

Figure 5:
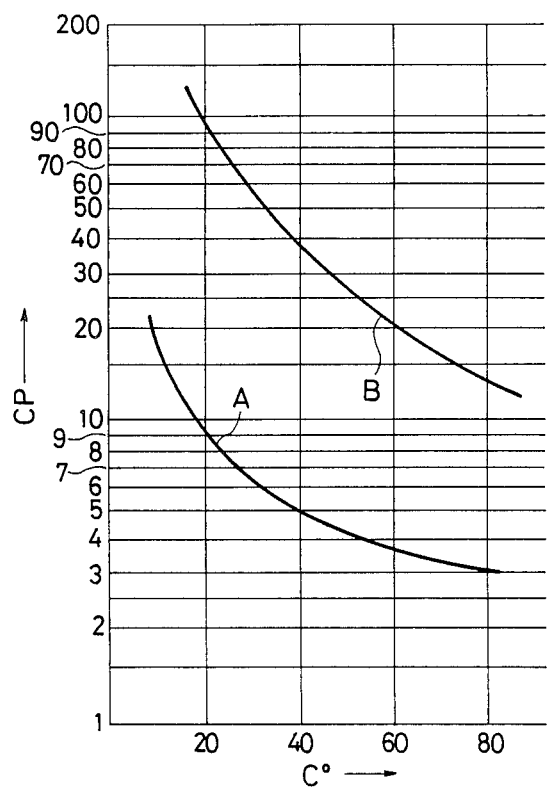
FIG. 5 is a chart showing a relation between a temperature and a viscosity.

A curve A shown in FIG. 5 depicts a temperature-viscosity characteristic of ink consisting of 50% of water, 47% of diethylene glycol and 3% of dye, and a curve B depicts a temperature-viscosity characteristic of ink in which most of water content has been evaporated and only 10% of water included in diethylene glycol remains.

As time elapses, the viscosity of the ink in the liquid discharge port changes from the characteristic A to the characteristic B as the water content is evaporated from the end of the liquid discharge port. It is seen from the characteristic A that the ink viscosity at 25° C. is 7 cp while it is 3.8 cp at 60° C. or approximately one half of that at 25° C. As seen from the characteristic B that the ink viscosity at 25° C. is 64 cp while it is 20 cp at 60° C. or less than $\frac{1}{3}$ of that at 60° C. By experiment, an ink viscosity of less than 20 cp allows ink discharge. It is therefore clear that the ink discharge is assured even after elapse of long period if the vicinity of the liquid discharge port is heated to 60° C. to 80° C. Japanese Patent Application Laid-Open No. 42466/1983 discloses two electro-thermal transducers arranged in a spaced relation from each other along a flow path of the liquid, but is not directed to solving the problem addressed by the present invention.

Since the record heads of the recorder of the present invention use the electro-thermal transducers 17a as the discharge energy generating means, the temperature of the ink in the vicinity of the liquid discharge port can be raised by energizing the transducers 17a under non-discharge condition without providing additional heat generating elements.

Further, in the record heads of the recorder of the present invention, the spacing between the electrothermal transducer 17a and the liquid discharge port 16a is as small as 100 μm and the ink layer therebetween is thin. Thus, the heat conduction speed to the ink in high. In addition the electro-thermal transducers 17a are arranged to the vitreous layer having an appropriate heat conservation effect. Accordingly, the rate of temperature rise of the transducers 17a by the heat generation of the transducers 17a is high, and is combination with the thinness of the ink layer, the ink in the liquid discharge port reaches 60° C. in several milliseconds. The need to delay the subsequent print operation is therefore reduced. If the ink is heated for several minutes. the water content in the ink is evaporated and the ink viscosity increases. Accordingly, it is desirable to heat the ink in a short time. In the present embodiment, since the liquid discharge ports 16a are arranged substantially above the transducers 17a, the low viscosity ink heated by the transducers 17a is easily discharged from the liquid discharge port and the subsequent printing discharge operation is assured. The positional relation between the transducers and the liquid discharge port is not limited to that of the embodiment.

Figure 6A:
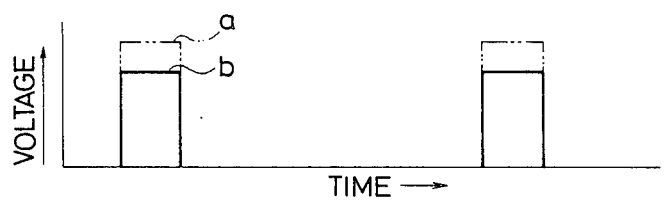
FIGS. 6A to 6C are charts illustrating different drive pulse controls.
Figure 6B:
Figure 6C:
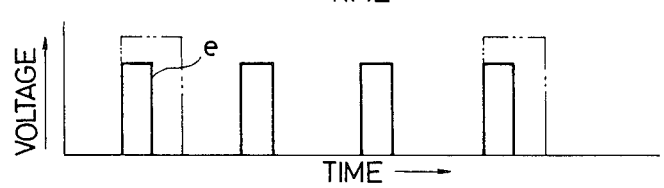

Referring to FIG. 6, non-discharge means (heating means to lower ink viscosity) is explained. FIGS. 6A, 6B and 6C show pulse waveforms applied to the transducer 17a. A double-dot chain line waveform is one for normal printing. In one method of non-discharge, a voltage level a in FIG. 6A is lowered to a voltage level b so that an input signal voltage is lowered from that which is applied in the normal printing. In another method, a pulse width c shown in FIG. 6B is narrowed to a pulse width d so that the pulse width is narrowed from that for the normal printing. In other methods, the methods of FIGS. 6A and 6B are combined. Further, in addition to the above methods, the applied voltage may be lowered and a repetition frequency may be increased in order to reduce a time required to raise the temperature of the ink. A waveform e in FIG. 6C corresponds thereto.

In a liquid jet recorder which discharges the liquid by thermal energy to form flying droplet, nondischarge energization is attained by energizing the discharge energy generating element at a temperature at which air bubbles are not generated by the application of the thermal energy to the liquid. The energization in the non-discharge condition (in the thermal energy recording system) is preferably less than 80% and, more preferably, less than 70% of a minimum voltage $V_{TH}$ which causes the generation of air bubbles and the discharge of the liquid. The pulse width P is preferably less than 70% of the pulse width in normal printing and more preferably less than 50% of the pulse width in normal printing.

In Japanese Patent Application Laid-Open No. 132263/1980, a waveform of a drive pulse is changed to increase a discharge speed of a droplet and a discharge frequency, but this method does not attain the ink non-discharge condition as is done in the present invention. Either singly or in combination of such methods are controlled by a microprocessor. Such processor is incorporated in each recorder and no additional microcomputer is needed. Thus, only software need be modified and the additional cost for executing above methods is very small.

The heating of the ink by the transducer 17a to lower the ink viscosity may be effected immediately after the power-on of the recorder and/or the first print command or immediately after the arrival of a record signal after non-arrival of the record signal for a predetermined time period (for example, three minutes). The heating may be effected if the record signal does not drive for the predetermined time period. In other words, heating to lower the ink viscosity may be effected when the power-on of the recorder is energized, and/or the first print command is issued or the record signal (discharge signal) is not produced and the waiting time exceeds the predetermined twice pariod.

The waiting time (print operation is not effected while the main power supply is on) may be counted by a conventional timer. The predetermined time period (reference time to be compared with the waiting time) may be determined in accordance with the characteristics, of the recorder and the ink. It is advisable to provide temperature sensing means to vary the reference time in accordance with the temperature to minimize the liquid discharge, unnecessary heating of the liquid and predischarge.

On the other hand, since the record by the first ten or more dots after the heating for lowering the ink viscosity are non-uniform in comparison with other dots because water content in the ink is small, the dot diameters are small. In order to resolve this problem, non-recording idle discharge is effected for ten or more dots after the heating for lowering the ink viscosity. As a result, the ink having desired viscosity and water content appears and uniform record dot size is obtained. Since the idle discharge does not require to fully replace the liquid in the vicinity of the liquid discharge port, high quality record state is attained by consuming only 1/10 to 1/100 of the ink required in the prior art idle discharge operations. Thus, the amount of ink wasted is significantly reduced.

The present invention offers a maximum effect when it is applied to the illustrated liquid jet recorder. It may also be applied to liquid discharge recorders as disclosed in West Germany OS Nos. 2843064 and 2944005.

In accordance with the present invention, an inexpensive, compact and highly reliable liquid jet recorder which does not need a cap device or non-discharge recovering device used in the prior art liquid jet recorder can be provided.

The present invention also provides a liquid jet recorder which can effect positive record operation without substantially changing the structure of the record head.

The present invention further provides a liquid jet recorder which does not significantly waste ink.

In the present invention, when the power is turned on when the ink has been sufficiently warmed up, the ink is not substantially heated or the viscosity is not substantially changed even if the discharge energy generating element is energized. Even such a condition is referred to as the heating for lowering the ink viscosity.

Figure 7:
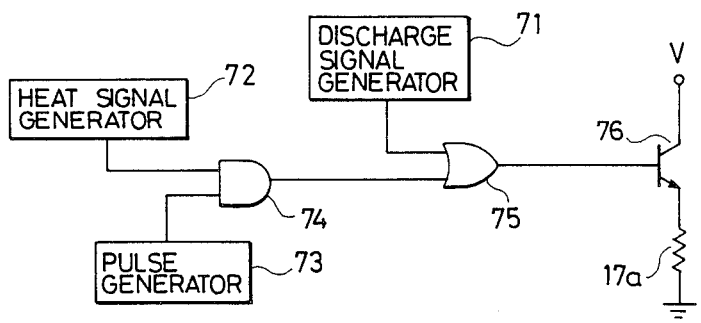
FIGS. 7 and 8 are control circuit and flow chart for explaining an embodiment of the present invention.
Figure 8:
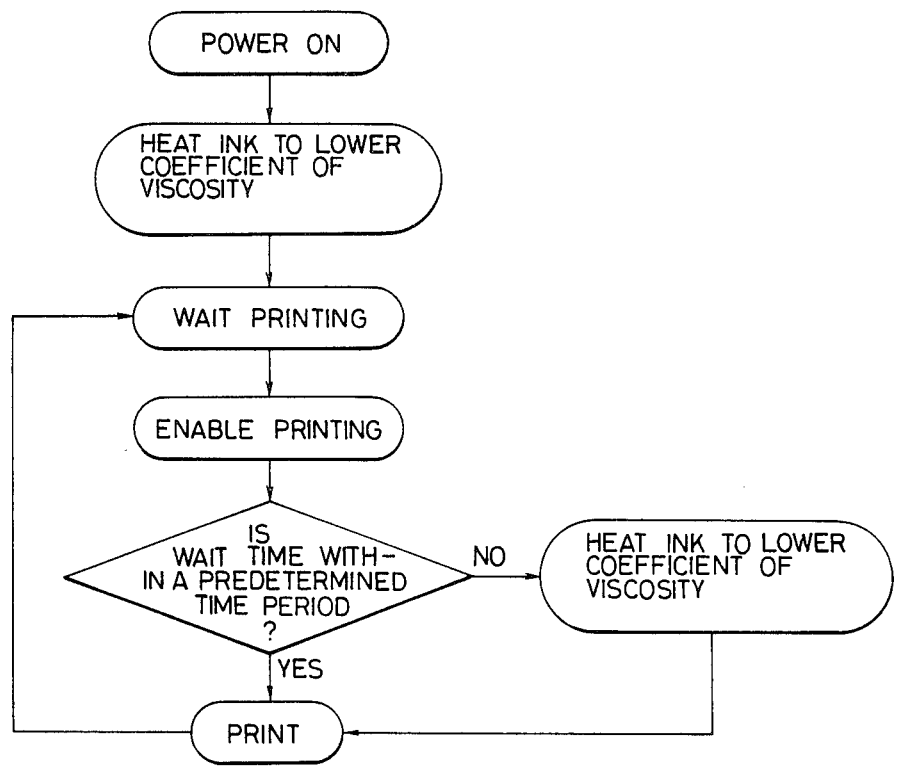

Referring to FIGS. 7 and 8, the embodiment of the present invention is explained in further detail. In a control circuit shown in FIG. 7, numeral 71 denotes a discharge signal generator for discharging the liquid from the liquid discharge port and forming a droplet, numeral 72 denotes a heating signal generator for heating the ink to lower the ink viscosity, numeral 73 denotes a pulse generator for generating a drive pulse to be applied to the electro-thermal transducer 17a when the ink is to be heated to lower the ink viscosity, numeral 74 denotes an AND gate, numeral 75 denotes an OR gate and numeral 76 denotes a transistor.

The signal from the heating signal generator 72 is generated when the recorder is powered on and/or the print command is issued, and the signal is applied to the AND gate 74. The pulse signal generated by the pulse generator 73 is also applied to the AND gate 74. The AND gate 74 produces an output signal only when the heating signal and the pulse signal are applied thereto, and the output signal is supplied to the OR gate 75 to which discharge signal 71 is applied. In the present invention, the discharge signal and the heating signal are not simultaneously generated during normal operation because the electro-thermal transducer for heating the ink to lower the ink viscosity and the electro-thermal transducer for discharging the liquid are common.

Accordingly, the OR gate 75 produces an output signal in response to the discharge signal or the heating signal, and the output signal is supplied to the transistor 76 and the voltage V is supplied to the electro-thermal transducer 17a.

In the present embodiment, the heating of the ink to lower the ink viscosity in the manner shown in FIG. 6B is used. A similar control circuit may be used when the heating method of FIG. 6A or 6C is used. When the voltage is to be changed, the drive voltage supplied to the electro-thermal transducer 17a may be changed by the otput of the AND gate 74. When both the voltage and the pulse width are to be changed, the combination of the above may be used. The frequency of the pulse generated by the pulse generator 73 and the pulse width may be selected to any values.

FIG. 8 shows a flow chart for explaining the flow of the heating of the ink to lower the ink viscosity and the liquid discharge. In FIG. 8, the heating of the ink to lower the ink viscosity is performed when the power is turned on or when the print waiting time reaches a predetermined time.

When the recorder is powered on, the heating of the ink to lower the ink viscosity is performed and then the recorder stands by for the print operation. Counting of timer means starts at this moment and the print waiting time is counted. When the print command is issued, the time counted by the timer means is compared with the preset time, and if the former is longer, the heating of the ink to lower the ink viscosity is again performed, and if the former is shorter, a print signal is immediately applied and printing is performed. After the printing, the recorder again stands by for printing and the counting of the timer means starts. The count in the timer is cleared when the print signal is applied to the recorder is set to the stand-by state so that the timer means starts to count from zero.

While the pre-discharge is not shown in FIG. 8, it may be performed after the heating of the ink.

What is claimed is:

1. A method for preventing non-discharge of liquid in a liquid jet recorder, comprising the steps of:
    providing a recorder having a record head for discharging liquid to record dots, said record head having a discharge energy generating element for generating heat when energized arranged on a substrate, a liquid discharge port arranged in relation to the discharge energy generating element to discharge liquid when the energy generating element is energized in a discharge mode and a liquid path for supplying liquid to the liquid discharge port; and
    energizing the discharge energy generating element in a non-discharge mode, wherein liquid is not discharged, when the recorder is powered on and/or when the time during which the recorder has not operated in the discharge mode exceeds a predetermined time period.

2. A method for preventing non-discharge of ink in a liquid jet recorder according to claim 1, wherein energization in the non-discharge mode is performed at a lower voltage than energization in the discharge mode, thus heating the liquid in the non-discharge mode to a lower temperature than that which will cause discharge of liquid from the discharge port.

3. A method for preventing non-discharge of ink in a liquid jet recorder according to claim 1, wherein energization in the non-discharge mode is performed by a pulse of a shorter pulse width than a pulse performing energization in the discharge mode, thus heating the liquid in the non-discharge mode to a lower temperature than that which will cause discharge of liquid from the discharge port.

4. A method for preventing non-discharge of ink in a liquid jet recorder according to claim 3, wherein said energization in the non-discharge mode is performed at a lower voltage than energization in the discharge mode.

5. A method for preventing non-discharge of ink in a liquid jet recorder according to claim 1, wherein energization in the non-discharge mode is performed a plurality of times.

6. A method for preventing non-discharge of ink in a liquid jet recorder according to claim 1, wherein energization in the non-discharge mode is performed immediately after power-on of the recorder and/or when the first print command is issued to the recorder after power-on.

7. A method for preventing non-discharge of ink in a liquid jet recorder according to claim 1, wherein energization in the non-discharge mode is performed when a print command is issued to the recorder after a predetermined time interval.

8. A method for preventing non-discharge of ink in a liquid jet recorder according to claim 1, wherein the time during which the recorder has not operated in the discharge mode is a non-print time.

9. A method for preventing non-discharge of ink in a liquid jet recorder according to claim 2, wherein the voltage in the non-discharge mode is smaller than 80% of the minimum voltage required in the discharge mode.

10. A method for preventing non-discharge of ink in a liquid jet recorder according to claim 3, wherein the pulse width in the discharge mode is less than 70% of the minimum pulse width required in the discharge mode.

11. A liquid jet recorder comprising:
    a record head for discharging liquid to record dots, said record head having a discharge energy generating element for generating heat when energized arranged on a substrate, a liquid discharge port arranged in relation to said discharge energy generating element to discharge liquid when said enegy generating element is energized in a discharge mode and a liquid path for supplying liquid to said liquid discharge port; and
    means for energizing said discharge energy generating element in a non-discharge mode, wherein liquid is not discharged, when the recorder is powered on and/or when the time during which the recorder has not operated in the discharge mode exceeds a predetermined time period, thereby to prevent non-discharge of liquid from said discharge port when the recorder is operated in the discharge mode.

12. A liquid jet recorder according to claim 11, wherein idle discharge which provides no recording is effected after energization of said discharge energy generating element in the non-discharge mode.

13. A liquid jet recorder according to claim 11, wherein said substrate is vitreous.

14. A liquid jet recorder according to claim 11, wherein at least a portion of said substrate on whch said discharge energy generating element is arranged is vitreous.

15. A liquid jet recorder according to claim 11, wherein said discharge energy generating includes an electro-thermal transducer.

16. A liquid jet recorder according to claim 11, wherein the recorder includes a plurality of said record heads.

17. A liquid jet recorder according to claim 11, wherein said record head is exchangeable.

18. A liquid jet recorder according to claim 17, wherein said record head has an engagement member for engaging a main body of the recorder.

* * * * *

UNITED STATES PATENT AND TRADEMARK OFFICE
CERTIFICATE OF CORRECTION

PATENT NO. : 4,712,172                                Page 1 of 3
DATED      : December 8, 1987
INVENTOR(S) : TAKEHIKO KIYOHARA, ET AL.

It is certified that error appears in the above-identified patent and that said Letters Patent is hereby corrected as shown below:

COLUMN 1

Line 50, "applied a" should read --applied to a--.
    Line 58, "other" should read --another--.
    Line 66, "other" should read --another--.
    Line 68, "electro thermal" should read --electro-thermal--.

COLUMN 2

Line 3, "other" should read --another--.
    Line 13, "been" should be deleted.
    Line 57, "one" should read --other--.
    Line 63, "ina" should read --in a--.
    Line 66, "Time" should read --The--.

COLUMN 3

Line 55, "substate 17." should read --substrate 17.--.
    Line 64, "head" should read --heat--.

COLUMN 4

Line 3, "of ellipse" should read --an ellipse--.
    Line 16, "to" should read --of--.
    Line 17, "the carriage" should read --to the carriage--.

UNITED STATES PATENT AND TRADEMARK OFFICE
CERTIFICATE OF CORRECTION

PATENT NO. : 4,712,172

DATED : December 8, 1987

INVENTOR(S) : TAKEHIKO KIYOHARA, ET AL.

It is certified that error appears in the above-identified patent and that said Letters Patent is hereby corrected as shown below:

COLUMN 5

Line 10, "on" should read --or--.
    Line 15, "calbe 3" should read --cable 3--.
    Line 22, "strike" should read --strikes--.
    Line 26, "groove 16." should read --groove 16b.--.
    Line 28, "on" (first occurrence) should read --or--.
    Line 39, "prink" should read --print--.

COLUMN 6

Line 43, "in" should read --is--.
    Line 48, "is" (second occurrence) should read --in--.
    Line 52, "minutes." should read --minutes,--.

COLUMN 7

Line 30, "of" should be deleted.
    Line 48, "twice pariod." should read --time period.--.
    Line 54, "tics," should read --tics--.
    Line 61, "are" should read --is--.

COLUMN 8

Line 64, "otput" should read --output--.

COLUMN 9

Line 20, "to" should read --or--.

UNITED STATES PATENT AND TRADEMARK OFFICE
CERTIFICATE OF CORRECTION

PATENT NO. : 4,712,172

DATED : December 8, 1987

INVENTOR(S) : TAKEHIKO KIYOHARA, ET AL.

It is certified that error appears in the above-identified patent and that said Letters Patent is hereby corrected as shown below:

COLUMN 10

Line 33, "enegy" should read --energy--.
    Line 57, "generating includes" should read --generating element includes--.

Signed and Sealed this

Seventeenth Day of January, 1989

Attest:

DONALD J. QUIGG

Attesting Officer      Commissioner of Patents and Trademarks